US006754847B2

(12) United States Patent
Dalal et al.

(10) Patent No.: US 6,754,847 B2
(45) Date of Patent: Jun. 22, 2004

(54) METHODS AND SYSTEMS FOR MONITORING QUALITY ASSURANCE

(75) Inventors: Siddhartha Ramanlal Dalal, Bridgewater, NJ (US); Ashish Jain, Bridgewater, NJ (US); Michael James Long, Edison, NJ (US); Gardner C. Patton, Bridgewater, NJ (US); Manish Ramesh Rathi, Randolph, NJ (US); James Edward Appenzeller, Metuchen, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 629 days.

(21) Appl. No.: 09/827,954

(22) Filed: Apr. 6, 2001

(65) Prior Publication Data

US 2003/0191988 A1 Oct. 9, 2003

Related U.S. Application Data

(60) Provisional application No. 60/195,879, filed on Apr. 7, 2000, and provisional application No. 60/230,661, filed on Sep. 7, 2000.

(51) Int. Cl.[7] .................................................. G06F 11/00
(52) U.S. Cl. ......................................................... 714/27
(58) Field of Search ............................... 714/27, 33, 35, 714/37, 45, 49

(56) References Cited

U.S. PATENT DOCUMENTS

| | | | | |
|---|---|---|---|---|
| 5,128,885 A | * | 7/1992 | Janis et al. ..................... 714/45 |
| 5,333,302 A | * | 7/1994 | Hensley et al. ................ 714/37 |
| 5,600,789 A | | 2/1997 | Parker et al. ........... 395/183.14 |
| 5,781,720 A | | 7/1998 | Parker et al. ........... 395/183.14 |
| 5,794,046 A | * | 8/1998 | Meier et al. ................. 717/128 |
| 5,870,559 A | * | 2/1999 | Leshem et al. .............. 709/224 |
| 5,878,384 A | | 3/1999 | Johnson et al. ............. 702/187 |
| 5,893,053 A | | 4/1999 | Trueblood .................. 702/187 |
| 5,958,008 A | | 9/1999 | Pogrebisky et al. ........ 709/223 |
| 5,974,572 A | * | 10/1999 | Weinberg et al. .............. 714/47 |
| 6,047,123 A | | 4/2000 | Brown et al. ................ 395/704 |
| 6,144,962 A | | 11/2000 | Weinberg et al. ............. 707/10 |
| 2002/0038388 A1 | * | 3/2002 | Netter ......................... 709/318 |
| 2002/0095454 A1 | * | 7/2002 | Reed et al. .................. 709/201 |
| 2002/0143931 A1 | * | 10/2002 | Smith et al. ................. 709/224 |
| 2003/0005044 A1 | * | 1/2003 | Miller et al. ................. 709/203 |
| 2003/0131008 A1 | * | 7/2003 | Paulin ......................... 707/100 |
| 2003/0131290 A1 | * | 7/2003 | Weinberg et al. ............. 714/46 |
| 2003/0191988 A1 | * | 10/2003 | Dalal et al. ................... 714/39 |

OTHER PUBLICATIONS

IBM, "Method to Intercept Dynamically Loaded Subroutine Calls on the IBM RISC System/6000 AIX Operating System", Mar. 1992, vol. 34, No. 10A, p. 382–387.

\* cited by examiner

*Primary Examiner*—Robert Beausoliel
*Assistant Examiner*—Bryce P. Bonzo
(74) *Attorney, Agent, or Firm*—Joseph Giordano

(57) ABSTRACT

Methods and systems are provided for monitoring a loosely coupled system, such as a web-based system and a business-to-business (B2B) system. In the case of a web-based system, exchanges between a web client and a web server may be monitored to determine quality and performance of the web-based system. The exchanges may include objects and attributes communicated from the web server to the web client. The exchanges may also include information about actions performed on objects as a user navigates through web pages displayed by the web client. For example, when the user selects a hyperlink, the monitoring system may recognize the hyperlink as an action. Accordingly, the actions along with the objects and their associated attributes may be recorded. The objects and their associated attributes may then be retrieved from the web server and the recorded actions may be played back against the retrieved objects based on the recorded attributes and the retrieved attributes. The results of the play back may be compared with the expected results to monitor the quality and performance of the web server. Additional actions may also be generated based on user defined rules and played against the retrieved objects to monitor alternate aspects of the web server.

36 Claims, 10 Drawing Sheets

FIGURE 8

METHODS AND SYSTEMS FOR MONITORING QUALITY ASSURANCE

CROSS-REFERENCE TO RELATED APPLICATIONS

This application claims the benefit of U.S. Provisional Application No. 60/195,879, filed Apr. 7, 2000 and U.S. Provisional Application No. 60/230,661, filed Sep. 7, 2000, the contents of both of which are hereby incorporated by reference.

BACKGROUND OF THE INVENTION

The present invention relates generally to the field of computer software, and more particularly, methods and systems for testing and monitoring quality and performance of systems. The systems may include loosely coupled systems, such as web-based systems and business-to-business (B2B) systems.

The advent of the Internet has led to the proliferation of loosely coupled systems. These systems use the connectivity provided by the Internet to collaborate to achieve a common business goal. Many businesses rely on such systems to make their products available to existing as well as potential customers over the Internet. For example, web-based systems offer businesses the ability to reach a large audience and offer new services with reduced time-to-market, while B2B systems allow several businesses to collaborate to achieve common business objectives. To stay competitive, businesses strive to develop and offer new services faster than their competitors. As the time-to-market for these businesses shorten, the data as well as the software that implements these systems may change frequently. Unfortunately, such frequent changes may introduce new defects or software bugs. These defects or software bugs may cause certain services to be inaccessible or fail, resulting in loss of sales and revenue for businesses.

To verify the quality and stability of these loosely coupled systems, it is essential to monitor the systems on a periodic basis or wait until an end user experiences a failure with a system and reports the failure. Accordingly, there is a need to monitor and periodically test such systems to reduce downtime as well as testing costs.

One known method for testing a Graphical User Interface (GUI) of a system is described in U.S. Pat. No. 5,600,789 ("the '789 patent") and U.S. Pat. No. 5,781,720 ("the '720 patent"), both of which are titled "Automated GUI interface testing." The method simulates in the GUI user events that are predefined in the form of test scripts written in a high level language. Some of the disadvantages of this method are that it is only applicable to testing the GUI of a system, and the testing is based on predefined events. Further, the method does not continuously monitor the system and notify an administrator of any detected changes in the system.

Another known method for testing a web-based system is described in U.S. Pat. No. 6,144,962 ("the '962 patent), titled "Visualization of web sites and hierarchical data structures." A similar method is also described in U.S. Pat. No. 5,958,008 ("the '008 patent), titled "Software System and associated methods for scanning and mapping dynamically-generated web documents." Both methods graphically map a topology of a web site and detect changes in the web site by comparing a current graphical map of the web site with a previously captured graphical map. One disadvantage of these methods is that they detect only limited changes to the overall topology of the web site.

SUMMARY OF THE INVENTION

To overcome the above and other disadvantages of the prior art, methods and systems are provided for monitoring the quality and performance of loosely coupled systems. In accordance with an embodiment of the present invention, a loosely coupled system, which may include objects and associated information about the objects, may be monitored as follows: One or more actions performed on one or more of the objects may be detected and recorded along with the objects and the associated information. The recorded actions may then be played back by retrieving from the system the objects and the associated information corresponding to the recorded objects, and if the retrieved information corresponding to the recorded objects on which the recorded actions are performed match the corresponding recorded information, performing the recorded actions on the corresponding retrieved objects. The results of the play back may then be used to detect one or more changes, if any, in the system.

Furthermore, additional actions may be generated based on the recorded objects on which the recorded actions are performed and the associated recorded information. These additional actions may be generated in accordance with information provided by, for example, a user. If the retrieved information corresponding to the recorded objects on which the recorded actions are performed match the corresponding recorded information, the additional actions may then be played by performing the additional actions on the corresponding retrieved objects. The results of the play back may then be used to detect one or more changes, if any, in the system.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show an embodiment of the invention, and together with the description, explain the principles of the invention.

BRIEF DESCRIPTION OF THE DRAWINGS

In the Figures:

FIG. 8 shows a user interface from which a user may define rules for generating additional actions, in accordance with an embodiment of the invention;

BEST MODE FOR CARRYING OUT THE INVENTION

Figure 1:
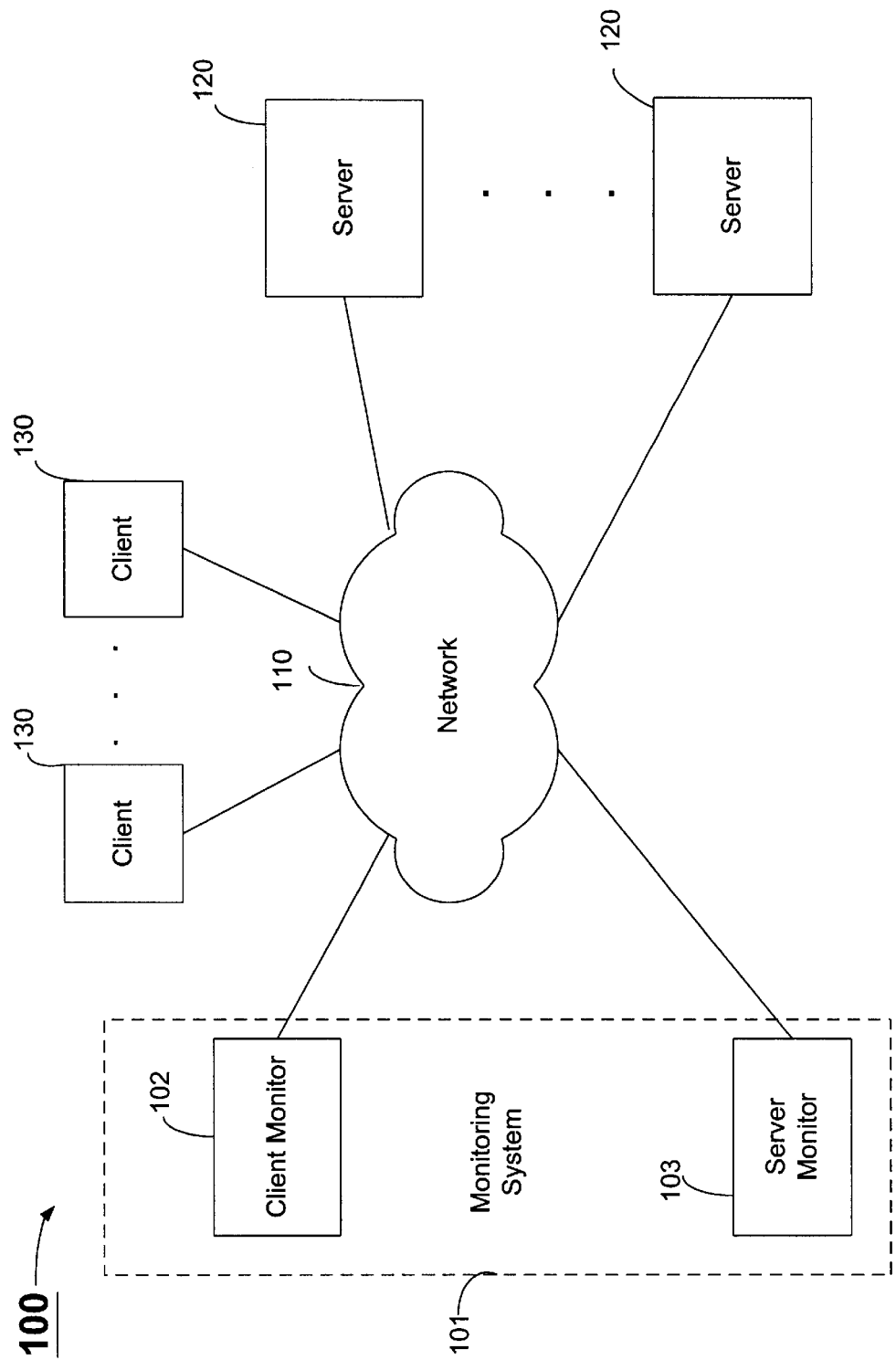
FIG. 1 is a block diagram of a system, in accordance with an embodiment of the invention.

Reference will now be made in detail to the preferred embodiment of the invention, examples of which are illustrated in the accompanying drawings. Wherever possible, the same reference numbers will be used throughout the drawings to refer to the same or like parts.

In accordance with an embodiment of the present invention, a monitoring system is provided for monitoring a loosely coupled system, such as a web-based system and/or a business-to-business (B2B) system. The loosely coupled system may include, for example, a first process running on a first computer and a second process running on a second computer. The first and second processes may communicate with each other by exchanging hierarchically structured data (HSD) using a predefined protocol. An example of a web-based system may include a web server and a web browser exchanging HyperText Markup Language (HTML) messages using a HyperText Transfer Protocol (HTTP). An example of a B2B-based system may include two business processes exchanging Extensible Markup Language (XML) messages via a direct Transmission Control Protocol/Internet Protocol (TCP/IP) socket. An example of a wireless-based system may include a wireless application server and a wireless client exchanging Wireless Markup Language (WML) messages using a Wireless Application Protocol (WAP).

The monitoring system may include a client monitor and a server monitor, which may communicate with each other over a network to monitor the loosely coupled system. In the case of a web-based system, the monitoring system may monitor exchanges between a web client and a web server to determine quality and performance of the web-based system. The exchanges may include objects and other associated information about the objects, such as attributes of the objects along with information about actions performed on the objects. An object may include any item that may be selected and/or manipulated, such as text, shapes, pictures, books, documents, software, etc. In a web-based system, an object may include, for example, a link displayed on a web page, a search field in a form, a radio list in a form, a check box in a form, a form, text on a web page, or an entire web page.

An attribute may describe the characteristics of an object and one or more data values associated with the object. For example, a link on a web page may include one or more of the following attributes: destination Uniform Resource Locator (URL), image source, text string associated with the link, and a link number. As another example, a text field in a form may include one or more of the following: the name of the text field, the value entered into the text field, the maximum and minimum length of the text field, the format of the text field, and the form to which the text field belongs. The format of the field may include, for example, the format of a telephone number, date, or credit card number.

In the case of a B2B system, the monitoring system may monitor, for example, XML messages exchanged between two or more business systems. In such a system, an object may include a message communicated from one business process to another business process. An attribute may include the content of the message, such as the name of the message, one or more tag names, and one or more values for each tag name.

For a web-based system, the monitoring system may monitor exchanges between the web client and the web server as follows: The monitoring system may monitor actions performed on objects as a user navigates through web pages displayed by the web client and record the actions and the objects displayed on the web pages and their associated attributes. For example, when the user clicks on a link displayed on a web page, the monitoring system may identify the link as an action and record the link and the attributes of the link. The monitoring system may then retrieve the objects and their associated attributes from the web server and play back the recorded actions against the retrieved objects. The monitoring system may compare the results of the play back with the expected results to monitor the quality and performance of the web server. The expected results may be based on the recorded objects, the recorded attributes, and the recorded actions. Moreover, before playing back the recorded actions against the retrieved objects, the monitoring system may automatically generate values, for those attributes that do not have a value, based on the attribute values of other matching recorded objects. Also, the monitoring system may generate additional actions to monitor additional aspects of the web server.

In addition, while monitoring the communications between the web client and the web server, the monitoring system may also simultaneously monitor communications between one or more business processes and the web server.

FIG. 1 is a block diagram of a system 100, in accordance with an embodiment of the invention. System 100 may include a monitoring system 101, a network 110, a plurality of servers 120, and a plurality of clients 130. Monitoring system 101 may include a client monitor 102 and a server monitor 103, which may communicate with each other over network 110. Client monitor 102 and server monitor 103 may each include any computer or processor, such as a personal computer, hand held computer, laptop computer, and wireless telephone.

Client 130 may include a first process, such as a web browser running on a computer or processor, such as a personal computer, laptop computer, hand held computer, and wireless telephone. Server 120 may include a second process, such as a web server running on a computer or processor, such as a personal computer, laptop computer, hand held computer, and wireless telephone. Alternatively, client 130 and server 120 may each include a business process, which may also communicate with each other over network 110.

Network 110 may include, for example, a Local Area Network (LAN), a Wide Area Network (WAN), a wireless network, the Internet, and/or any other communication medium.

Figure 2:
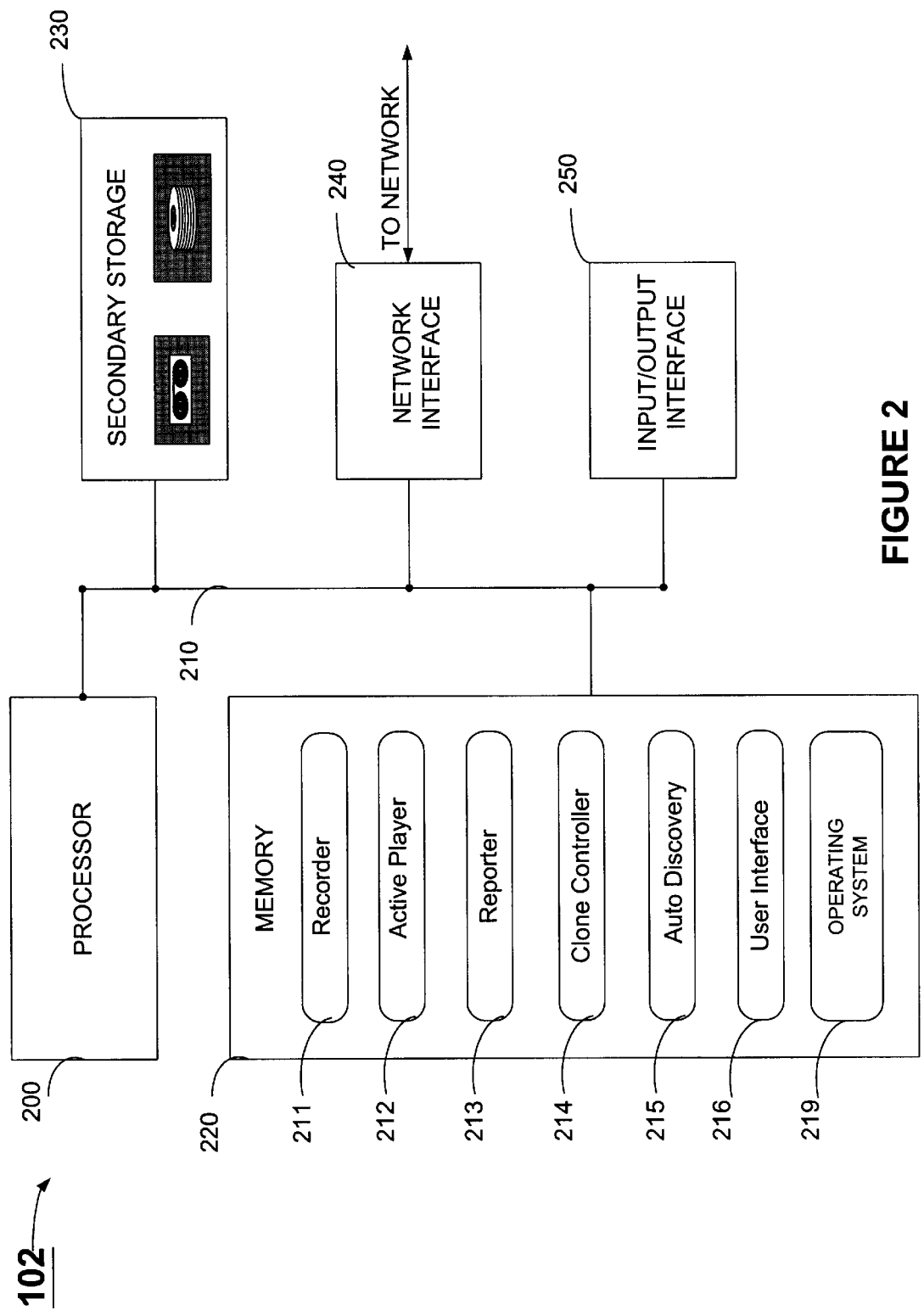
FIG. 2 is a block diagram of a client monitor, in accordance with an embodiment of the invention.

FIG. 2 is a block diagram of client monitor 102, in accordance with an embodiment of the invention. Client monitor 102 may include a processor 200, which connects over bus 210 to a memory 220, a secondary storage 230, a network interface module 240, and an input/output interface module 250.

Memory 220 may include a recorder program 211, an active player program 212, a reporter program 213, a clone controller program 214, an auto discover program 215, a user interface program 216, and an operating system 219. Alternatively recorder program 211, active player program 212, reporter program 213, clone controller program 214, and auto discover program 215 may each run on separate computers and communicate with each other over network 110. Recorder program 211 may record exchanges between the web browser and the web server. The exchanges may include objects and their associated attributes along with information about actions performed on one or more of the objects. Active player program 212 may play and/or play back the actions against objects retrieved from the server 120. Clone controller program 214 may generate additional actions based on information provided by a user, which may then be played by the active player program 212. Auto discover program 215 may automatically determine attribute values for those retrieved objects that have no attribute values based on the attribute values of other matching recorded objects. Reporter program 213 may generate reports about changes detected in the web server. User interface program 216 may provide, for example, a graphical user interface (GUI) through which the user may interact with client monitor 102. Alternatively, user interface program 216 may provide an alphanumeric or character based interface.

Secondary storage 230 may include a computer readable medium, such as a disk drive and a CD drive or a read/write CD drive. From the CD drive or the read/write CD drive, software and data may be loaded onto the disk drive, which may then be copied into memory 220. Similarly, software and data in memory 220 may be copied onto the disk drive, which may then be loaded onto a read/write CD drive.

Network interface module 240 may include hardware and software for sending and receiving data over network 110.

Input/Output module 250 may include, for example, a key board, a pointing device, or a key pad and a display unit or a printing device.

Figure 3:
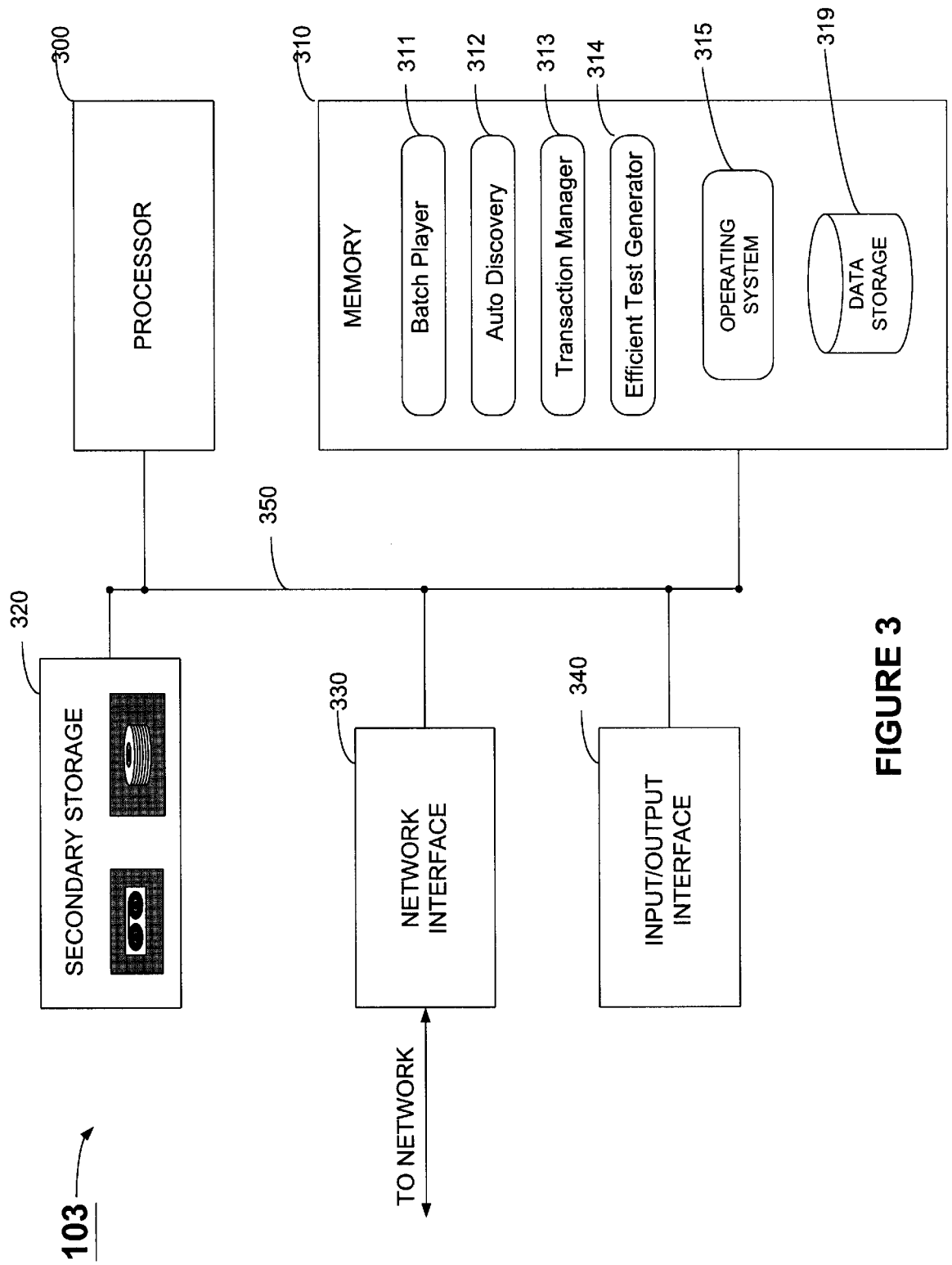
FIG. 3 is a block diagram of a server monitor, in accordance with an embodiment of the invention.

FIG. 3 is a block diagram of server monitor 103, in accordance with an embodiment of the invention. Server monitor 103 may include a processor 300, which connects via bus 350 to a memory 310, a secondary storage 320, a network interface module 330, an input/output interface module 340.

Memory 310 may include a batch player program 311, an auto discover program 312, a transaction manager program 313, and an efficient test generator program 314. Memory 310 may also include an operating system 315 and a data storage module 319, such as, a database. Secondary storage 320 may include a computer readable medium, such as a disk drive and a CD drive or a read/write CD drive. From the CD drive or the read/write CD drive, software and data may be loaded onto the disk drive, which may then be copied into memory 310. Similarly, software and data in memory 310 may be copied onto the disk drive, which may then be loaded onto the read/write CD drive.

Network interface module 330 may include hardware and software for sending and receiving data over network 110.

Input/Output module 340 may include, for example, a key board, a pointing device, or a key pad and a display unit or a printer device.

Figure 4:
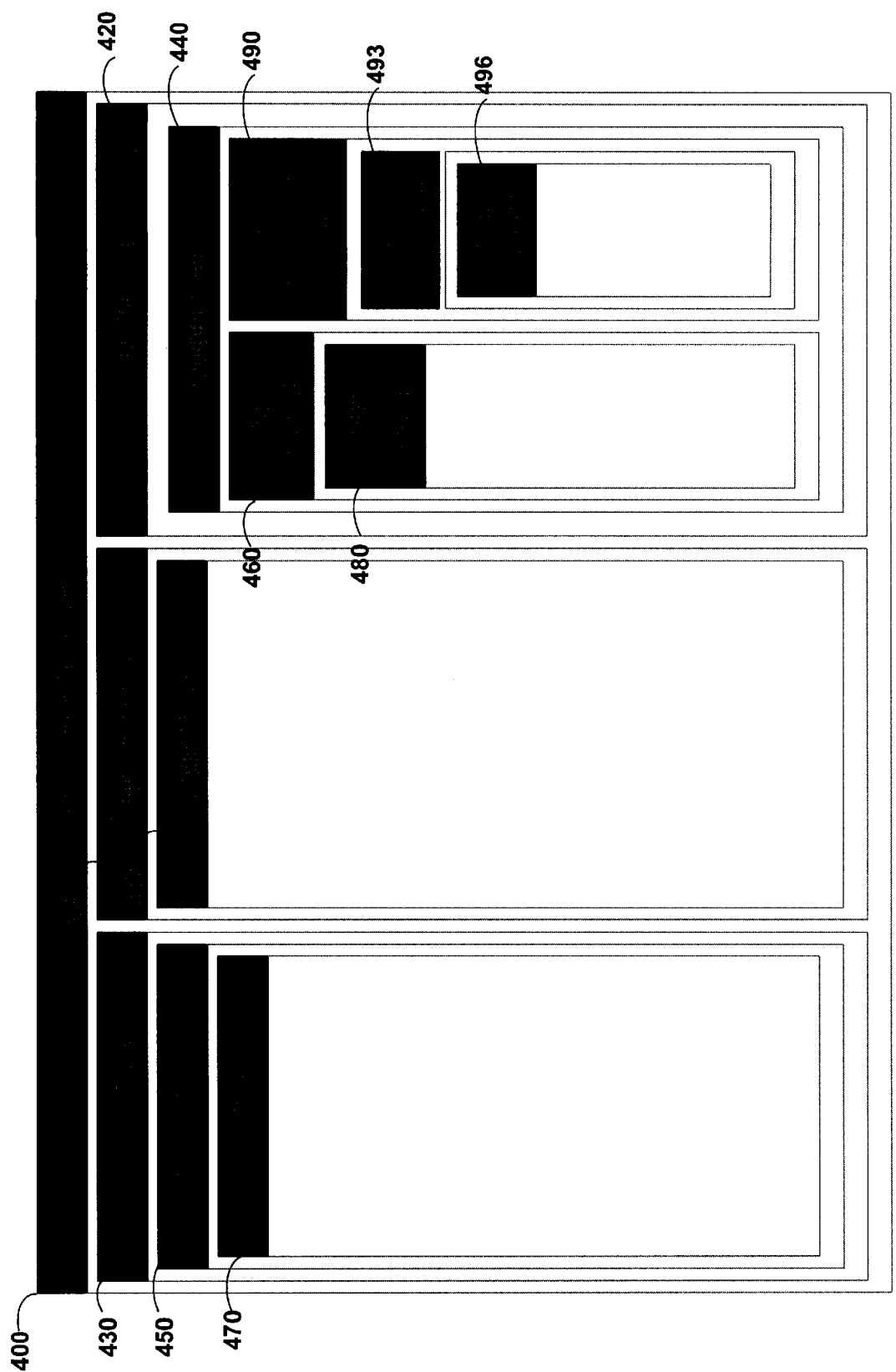
FIG. 4 is a diagram of a FlowTemplateObject, in accordance with an embodiment of the invention.

FIG. 4 is a diagram of a FlowTemplateObject 400, in accordance with an embodiment of the invention. FlowTemplateObject 400 may include a high level object oriented data structure for storing information about exchanges between, for example, client 130 and server 120. Those of ordinary skill in the art will recognize that such data structures may be implemented in any object oriented programming language, such as C++, Java, etc. FlowTemplateObject 400 may include three primary sub-objects, ActionBlock 430, PageModelSet 410, and an OutputPageSet 420. ActionBlock 430 may include information about recorded actions and the corresponding objects on which the actions are performed. PageModelSet 410 may include information about web pages downloaded into client 130 and displayed using a web browser. OutputPageSet 420 may include information about the expected results when the recorded actions are played back against objects retrieved from server 120.

Figure 5:
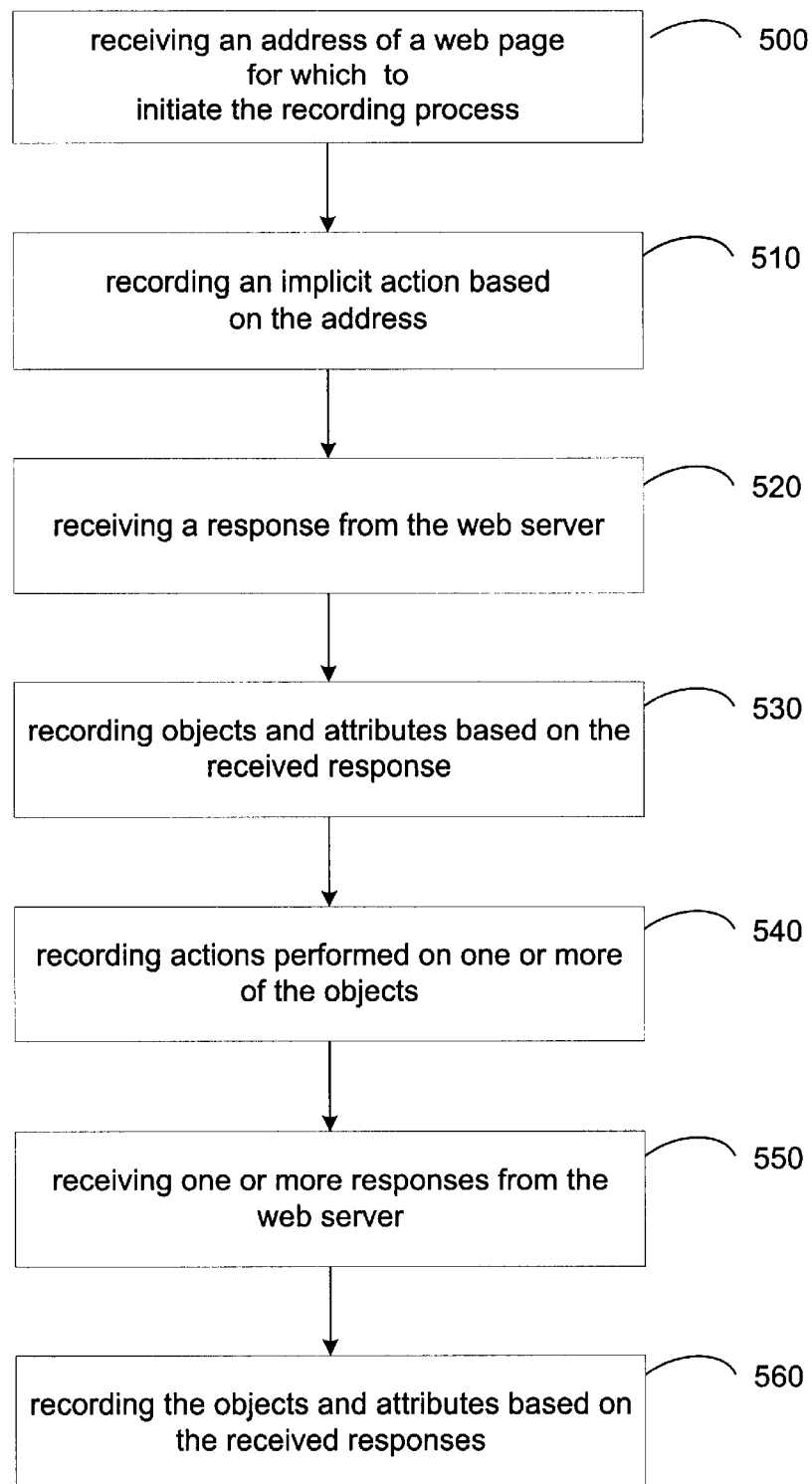
FIG. 5 is a flow chart of the steps performed by a recorder program to record objects and their associated attributes and the actions performed on those objects, in accordance with an embodiment of the invention.

FIG. 5 is a flow chart of the steps performed by recorder program 211, in accordance with an embodiment of the invention. Recorder program 211 may receive in memory 220 an address of a web page as a starting point for recording (step 500). The address may include a URL, an Internet Protocol ("IP") address, or a wireless protocol address. Next, recorder program 211 may create a FlowTemplateObject 400, which may include an instance of an ActionBlock 430. Recorder program 211 may then store the address in the ActionBlock 430 as an implicit action, thereby recording the action (step 510).

Recorder program 211 may call a Microsoft Internet Explorer application programming interface (API) running on client 130 to monitor exchanges between a web browser running on client 130 and a web server running on server 120. Furthermore, recorder program 211 may also call the Microsoft Internet Explorer API to communicate with the web server via the web browser. The Microsoft Internet Explorer API is described in the "Programming the Internet Explorer 5," Microsoft Press, ISBN:0-7356-0781-8, which is incorporated herein by reference in its entirety. Alternatively, other web browsers and tools may be used instead.

Recorder program 211 may send the address in a request to the web browser via the Microsoft Internet Explorer API, requesting the web browser to download the starting web page from the web server onto client 130 and to display the web page. The web browser may in turn send to the web server the request to download the web page.

When the web browser receives from the web server a response, such as an HTML page, recorder program 211 may then receive from the Microsoft Internet Explorer API a notification of the response (step 520). Upon receiving the notification, recorder program 211 may create in PageModelSet 410 an instance of PageModel object 415, which may include information about the downloaded HTML page. Recorder program 211 may store a copy of the HTML page in the PageModel object 415, which may be parsed to determine the objects and attributes of the HTML page (step 530).

Recorder program 211 may also receive a notification when a user performs an action on an object displayed on a web page. An action may include any user interaction with an object, such as the user clicking on a hyperlink displayed on a web page. For example, recorder program 211 may receive a notification from the Microsoft Internet Explorer API when the web browser requests from the web server the HTML page corresponding to the hyperlink clicked by the user.

Recorder program 211 may then create an instance of the ActionBlock 430 and may record the action by storing in ActionBlock 430 information about the action and the particular object on which the action is performed (step 540). For example, if the action includes the user's act of clicking on a submit button on a form, recorder program 211 may store in ActionBlock 430 information about the form. Furthermore, recorder program 211 may create an instance of an eFormElements object 450 and store in the eFormElements 450 information about the objects on that form and their associated attributes. The attributes may include, for example, values entered by the user onto the form. Recorder program 211 may also create an instance of an eFormElement object 470 for each individual object on the form, including the submit button clicked by the user. The recorder program 211 may store in each eFormElement 470 information about the individual objects on the form, such as the name of each object as it appears in the HTML page.

As another example, if the action includes the user's act of clicking on a hyperlink displayed on the web page, recorder program 211 may store in ActionBlock 430 information about the hyperlink. The hyperlink information may indicate that a particular HTML link is clicked. The hyperlink information may include the destination URL and the text that is located on the hyperlink.

When the web browser receives from the web server a response, such as the HTML page corresponding to the hyperlink, recorder program 211 may then receive from the Microsoft Internet Explorer API a notification of the response (step 550). Upon receiving the notification, recorder program 211 may create in PageModelSet 410 an instance of PageModel object 415. Recorder program 211 may then store a copy of the HTML page in the PageModel object 415, thereby recording the objects and attributes in the HTML page (step 560).

For each subsequent action, if any, recorder program 211 may repeat steps 520 through 560 until no more actions are detected by the recorder program 211. The series of recorded HTML pages and the recorded actions performed on the objects in the HTML pages are collectively herein referred to as a "recorded flow" or a "flow." Recorder program 211 may repeat the above steps to record one or more additional flows. Finally, recorder program 211 may send the resulting FlowTemplateObject 400 over network 110 to transaction manager 313 for storage in database 319.

Figure 6:
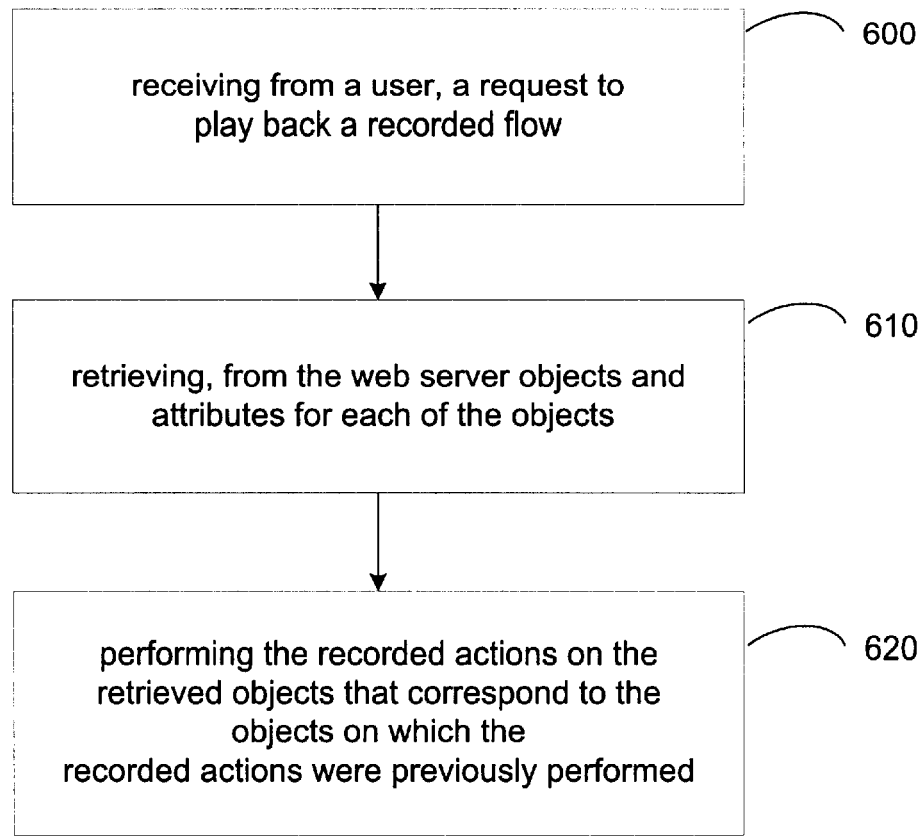
FIG. 6 is a flow chart of the steps performed by an active player program to play back recorded actions, in accordance with an embodiment of the invention.

FIG. 6 is a flow chart of the steps performed by active player program 212, in accordance with an embodiment of the invention. Active player program 212 may receive a request from a user to play back a recorded flow (step 600). For each of the recorded actions in the flow, active player program 212 may retrieve from the web server objects corresponding to the recorded actions. For example, active player program 212 may send the address stored in an instance of ActionBlock 430 that corresponds to the first recorded action to the web browser requesting it to download a web page corresponding to the address from the web server and to display the web page. The web browser may in turn send the request to the web server.

The web browser may receive from the web server a response, such as an HTML page corresponding to the address, and display a web page based on the response. For each subsequent recorded action, if any, active player program 212 may receive from the Microsoft Internet Explorer API a notification of the response (step 610). Upon receiving the notification, active player program 212 may then parse the HTML page to identify a retrieved object that corresponds to the recorded object on which the subsequent recorded action was previously performed. If a corresponding retrieved object is identified, active player program 212 may send a request to the web browser to perform the subsequent recorded action on the corresponding retrieved object (step 620). The web browser may in turn send the request to the web server. The web browser may receive from the web server a response, such as an HTML page corresponding to the address, and display a web page based on the response.

If a corresponding retrieved object is not identified, then active player program 212 may determine a result of "failed" for the recorded action as well as an explanation for the failure. If each of the recorded actions can be performed on a retrieved object, active player program 212 may determine a result of "passed" for the recorded actions. Active player program 212 may monitor the web server based on the results. Active player program 212 may display the results to the user.

Active player program 212 may also monitor performance information, such as server delay and network delay. Server delay may include a measure of time taken by the web server to respond to the web browser. Network delay may include a measure of time taken by the web browser to send a request to the web server through network 110.

Finally, active player program 212 may send the results and performance information via network 110 to transaction manager 313 for storage in database 319. Active player program 212 may repeat the above steps to play back other recorded flows.

Reporter program 213, in accordance with an embodiment of the invention, may generate one or more reports based on the results from the steps performed by active player program 212. User interface program 216 may allow a user to specify which results and performance information to include in the reports. Once the user specifies the results and performance information, reporter program 213 may retrieve those results and performance information over network 110 from transaction manager program 313. Reporter program 213 may then generate the reports based on the retrieved results and performance information. In addition, reporter program 213 may use statistical control chart analysis to infer trends in the web server and identify instances which are not logically supported by the trends. The reports may include, for example, graphs and tables, which may provide a summary of the retrieved results, performance information, and results of the trend analysis. Reporter program 213 may display the reports to the user via user interface program 216. Alternatively, reporter program 213 may output the reports to an output device, such as a printer. The reports may be translated by the transaction manager program 313 into XML as well as other formats supported by existing management software such that other reporting software may be used to view and output the reports.

Clone controller program 214 may generate one or more additional actions based on information provided by a user to monitor and test alternate aspects of the web server. The information provided by the user may include one or more alternate values for one or more recorded actions. As an illustration, consider recorder program 211 recording the following flow: Using the web browser, the user may download onto client 130 a first web page from the web server. The first web page may include a form with a pull down list that allows a single selection from one of three categories, such as "Books," "Music," and "Computers." If the user selects the category "Music," the web browser may display a second web page that may include a form with a title "Search Page," a search field specifying a name of a musical composition, and a "Submit" button. The user may then enter "Mozart Symphony No. 5" into the search field and click the "Submit" button. In response to the user's action, the web browser may display a third web page that may include a title "Search Results," a selection list of musical compositions that match the title, and an "Add to Shopping Cart" button.

Through user interface program 216, the user may provide one or more alternate values for one or more of the actions recorded above by recorder program 211. For example, clone controller program 214 may use the alternate values to generate a sequence of additional actions including a first action ("a1") that selects from the pull down list on the first web page the category of "Books" instead of "Music." Clone controller program 214 may also use the alternate values to generate a second action ("a2") that enters into the search field on the second web page the value "War and Peace" instead of entering "Mozart Symphony No. 5" and then clicking the "Submit" button.

Figure 8:
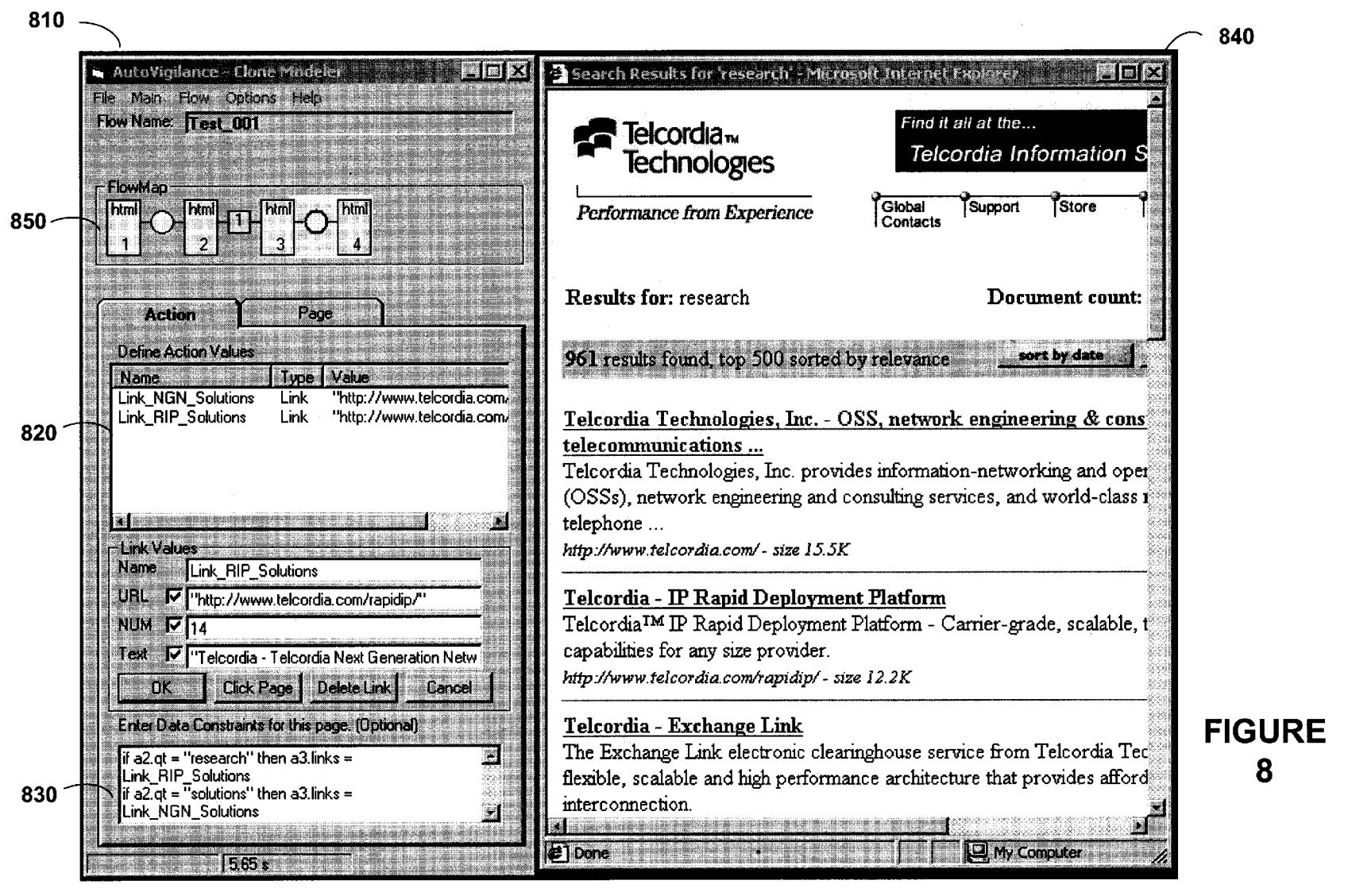

User interface program 216 may display the GUI shown in FIG. 8 to the user. The GUI may display a flowmap 850 object that may graphically represent a recorded flow. On flowmap 850, rectangles may represent HTML pages, circles may represent actions, and squares may represent form actions. As shown, the flowmap may include a link action "a1," a form action "a2," and another link action "a3." The user may click on an action on flowmap 850 to select an action for which the user wishes to provide one or more alternate values. For example, a user may click on a3 in flowmap 850 to view the web page 840 that corresponds to the address in a3.

The user may then provide alternate values for the link action a3 as follows: The user may provide an alternate value for the link action a3 by clicking on the "Click Page" button. User interface program 216 may then prompt the user to select a link on the web page 840. When the user clicks on a link on the web page, user interface program 216 may add the link to the contents of the properties page 820. As shown in properties page 820, two alternate values for a1, "Link_NGN_Solutions" and "Link_RIP_Solutions," are provided by the user. When the user indicates to the user interface program 216 that the user is done providing the alternate values for the actions, the user interface program 216 may send the alternate values to clone controller program 214. Alternatively, the alternate values may be automatically generated by applying a heuristic method to information stored in a knowledge base. The heuristic method may be applied by a separate program or process or by clone controller program 214.

Figure 7:
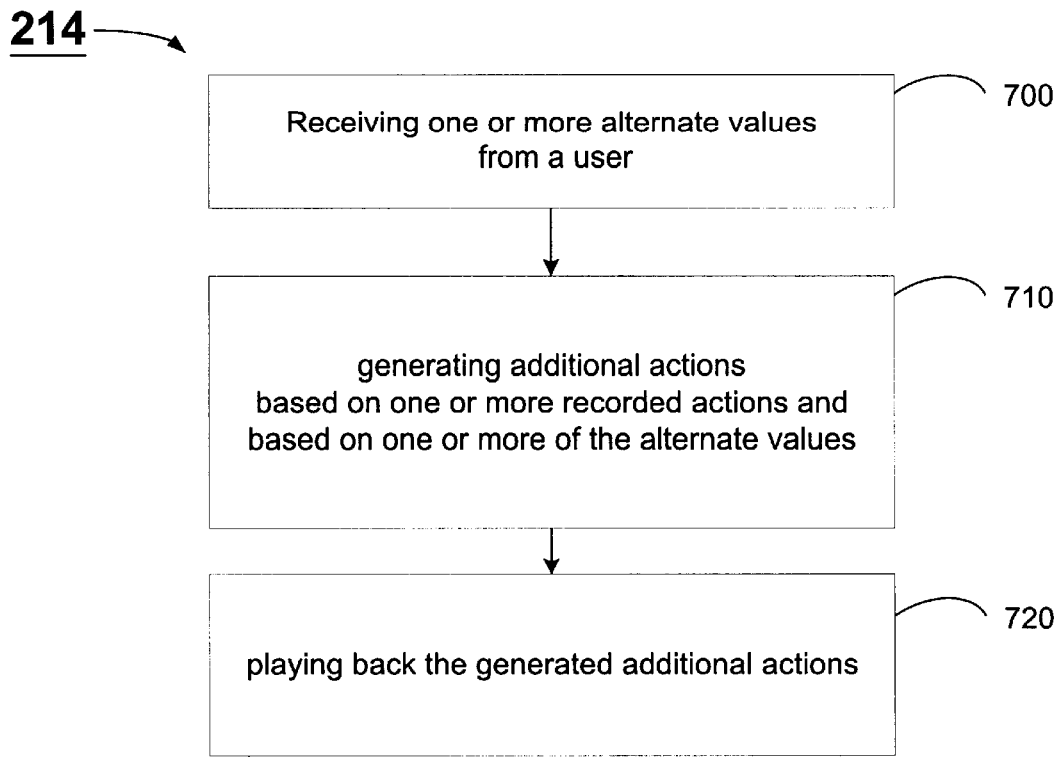
FIG. 7 is a flow chart of the steps performed by a clone controller program to generate additional actions, in accordance with an embodiment of the invention.

FIG. 7 is a flow chart of the steps performed by clone controller program 214, in accordance with an embodiment of the invention. Clone controller program 214 may receive from the user via the user interface program 216 one or more alternate values for one or more of the recorded actions (step 700). For each alternate value, clone controller program 214 may store information about the alternate value in the instance of the ActionBlock 430 corresponding to the particular recorded action for which the alternate value is provided. For example, clone controller program 214 may store in the ActionBlock 430 corresponding to action a1 information, such as the destination URL for the "Link_NGN_Solutions" link, the visible text of the link, and the numerical index of the link.

Accordingly, based on the alternate values provided by the user, the instance of the ActionBlock 430 corresponding to the first action a1 may be extended to include information about the category "Books." In addition, the instance of the ActionBlock 430 corresponding to the second action a2 may be extended to include information about the selection of "War and Peace" in the search field.

Clone controller 214 may generate a list of actions based on the recorded actions, which may include the extended a1 and the extended a2 actions. Clone controller program 214 may send the generated list of actions over network 110 to server monitor 103, where efficient test generator program (AETG) 314 may receive the generated list of actions. The AETG program 314 is disclosed in U.S. Pat. No. 5,542,043, titled "Method and System for Automatically Generating Efficient Test Cases for Systems Having Interacting Elements," which is incorporated herein by reference. The AETG program 314 may generate one or more sequences of actions for all possible combinations of the generated list of actions. For example, the sequences of actions generated by AETG program 314 may include the following.

| Sequence No. | Category | Search field |
| --- | --- | --- |
| 1. | Music | Mozart Symphony No. 5 |
| 2. | Book | War and Peace |
| 3. | Music | War and Peace |
| 4. | Book | Mozart Symphony No. 5 |

The user may wish to exclude some of the sequences of actions generated by AETG program 314, such as sequences 3 and 4 because those sequences may not be relevant to the aspects of the web server that the user desires to monitor.

Through the interface provided by user interface program 216, the user may define one or more rules for constraining the AETG program 314 from generating such sequences of actions. For example, the user may define a rule specifying that if the first action has a category equal to "Books," then the second action must have a search field with a value of "War and Peace." The user may also specify that if the first action has a category equal to "Music," then the second action must have a search field with a value of "Mozart Symphony No. 5."

To define such a rule, the user may select an action on the flowmap 850. The user may now enter into the data constraint textbox 830 the following rule: "if a1.category= "Books" then a2.search_field="War and Peace." The user may also define the following rule "if a1.category="Music" then a2.search_field="Mozart Symphony No. 5." User interface program 216 may send the rules to the clone controller program 214.

Accordingly, based on the above rules, the AETG program 314 may exclude sequences of actions 3 and 4 and instead only generate the following sequences 1 and 2:

| Sequence No. | Category | Search field |
| --- | --- | --- |
| 1. | Music | Mozart Symphony No. 5 |
| 2. | Book | War and Peace |

The server monitor 103 may send the generated sequences of actions via network 110 to clone controller program 214. For each of the generated sequences of actions, clone controller 214 may generate sequences of ActionBlock 430. For example, for each of the actions in a sequence, clone controller program 214 may create an instance of ActionBlock 430 and store information about the action into the instance of the ActionBlock 430 (step 710). For each generated sequence of actions, active player 212 may then play the actions in the same manner as the recorded actions are played back against the objects retrieved from the web server (step 720).

The user may also define one or more rules (also referred to as "page matching rules") for comparing the retrieved objects with the objects in a recorded flow. The rules may include one or more of the following: "match title"; "match URL"; "match text"; "verify an object exists"; "match all forms"; and "match not text." For example, the user may select a web page and define a rule for "match title" and specify the string "Search Page."

When playing back a recorded flow, active player program 212 may compare the attributes of objects retrieved from the web server with those of the objects in the recorded flow. If the comparison fails, then active player program 212 may indicate that a change to the web page has occurred in the web server. For example, if a retrieved object includes the title of a web page, active player program 212 may compare the attribute value of the retrieved object with that of its corresponding recorded object. If the attribute value does not match, for example, "Search Page," then active player program 212 may determine that the title of that web page has changed.

Finally, the user may define one or more additional rules for disabling and/or enabling one or more of the page matching rules based on the values of the particular recorded actions. For example, the user may define a rule to verify that an object having an image of the book "War and Peace" exists on the third web page. Recall that clone controller program 214 may generate the sequences of actions 1 and 2, and that active player program 212 may play the actions in sequences 1 and 2. While playing back the actions in sequence 1, active player program 212 may apply the page matching rule to verify that an object having an image of the book "War and Peace" exists on the third web page. In this example, active player program 212 may not locate an object on the third web page with an image of the book "War and Peace." The user may instruct active player program 212 to limit the application of the page matching rule to sequence 2 by providing an additional rule that disables the application of the page matching rule to sequence 1. For example, the user may define an additional rule that limits the application of the page matching rule to sequences of actions where "a2.search_field='War and Peace.'" In this example, only sequence 2 has an action a2 with a search_field containing the value "War and Peace." Thus, active player program 212 may only apply the page matching rule to the third web page when action a2 in sequence 2 is played.

Figure 9:
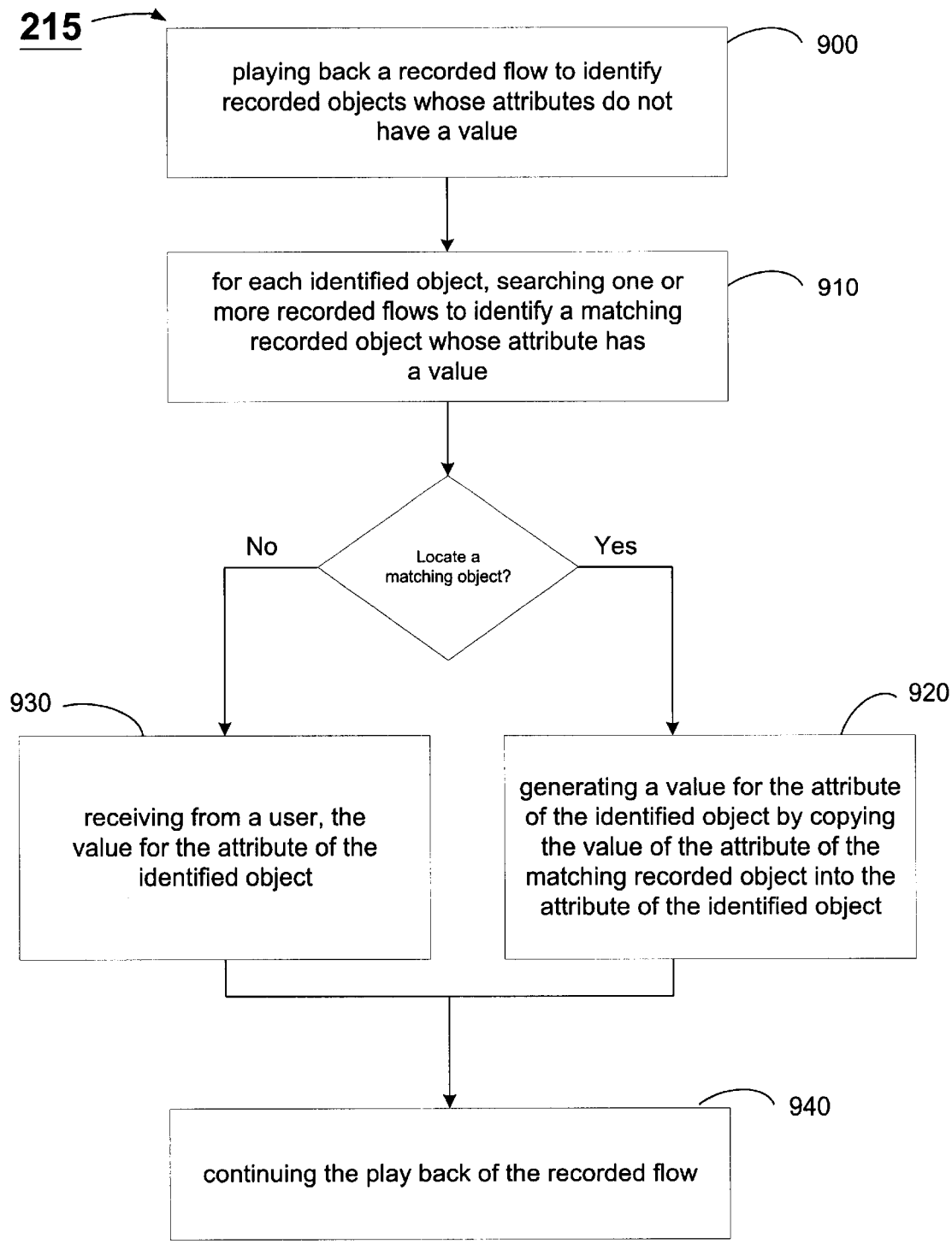
FIG. 9 is a flow chart of the steps performed by an auto discover program to automatically determine attribute values for objects, in accordance with an embodiment of the invention.

FIG. 9 is a flow chart of the steps performed by an auto discover program 215 to automatically determine attribute values for objects in recorded flows, in accordance with an embodiment of the invention. Auto discover program 215 may invoke active player program 212 to play back a recorded flow such that recorded objects whose attributes do not have a value are identified (step 900). For example, an object may include a field in a form, such as an address field, for which a user has not supplied a value. For each identified object without an attribute value, auto discover program 215 may search one or more recorded flows to identify a matching recorded object whose attribute has a value (step 910). If a matching recorded object is found, auto discover program 215 may use the attribute value of the matching recorded object as the attribute value of the identified object by, for example, copying the attribute value of the matching recorded object into the attribute field of the identified object (step 920). For each identified object that auto discover program 215 does not identify a matching recorded object, auto discover program 215 may ask the user to provide a value for the attribute (step 930). Upon the user providing the value, auto discover program 215 may store the value into the attribute field of the identified object.

Active player program 212 may then continue the play back of the recorded flow (step 940).

Batch player program 311 may perform at a scheduled time the steps performed by active player program 212 except without user interaction.

Batch auto discover program 312 may perform at a scheduled time the steps performed by auto discover program 215 except without any user interaction.

Figure 10:
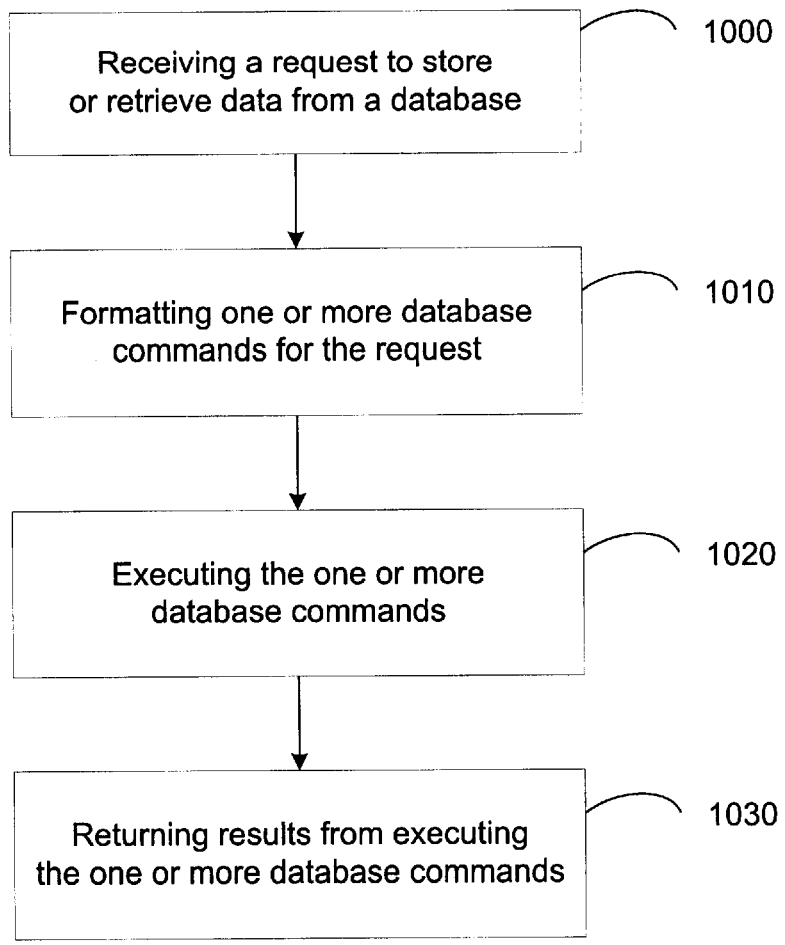
FIG. 10 is a flow chart of the steps performed by a transaction manager program, in accordance with an embodiment of the invention.

FIG. 10 is a flow chart of the steps performed by transaction manager 313, in accordance with an embodiment of the invention. Transaction manager 313 may receive a request to perform a transaction (step 1000). For example, the request may be to store/retrieve a FlowTemplateObject 400 to/from data storage 319. Transaction manager 313 may determine the type of request and may format one or more database commands to process the request (step 1010). Transaction manager 313 may then send the database commands to data storage 319 for execution (step 1020). Finally, transaction manager 313 may return the results of the executions to the requester (step 1030).

In an alternative embodiment, the methods and systems described herein may be used to monitor the quality and performance of a business-to-business (B2B) system. For example, the monitoring system 101 may monitor exchanges between a first business process running on a first computer and second business process running on a second computer. The exchanges may include objects and attributes in Extensible Markup Language (XML) along with actions performed on the objects. An action may include an XML message communicated from the first process to the second process. An object may include an XML message communicated from the second process to the first process. An attribute may include the content of the message, such as the name of the message, one or more tag names, and one or more values for each tag name.

In yet another alternate embodiment, the methods and systems described herein may be used to monitor the quality and performance of a web-based system communicating with a B2B system. For example, the monitoring system 101 may monitor exchanges between the web client and the web server while monitoring communications between a business process and the web server.

While it has been illustrated and described what is at presently considered to be a preferred embodiment and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

APPENDIX

In accordance with an embodiment of the invention, a FlowTemplateObject 400 may include the following data structure: The m_StartURL field may include an initial URL that begins a flow. The m_NumPages field may include information about the number of HTML pages in the flow. The m_authinfo() field may include information about a username and a password for each page in the flow. The m_constraints field may include rules constraining the AETG program 314 from generating undesired actions. The m_cookie() field may include information about a cookie associated with an HTML page. The m_PageModelSet field may include one or more PageModel 415 objects. The m_Steps() field may include an array of instances of ActionBlock 430, where each instance represents one action. The m_OutputPageSet object may include one or more OutputPage 440 objects.

```
FlowTemplateObject
{
    m_StartURL // String
    m_NumPages // Integer
    m_authinfo() // ARRAY String
    m_constraints // String
    m_cookie() // ARRAY String
    m_PageModelSet // PageModelSet
```

APP 1255
    m_Steps() // ARRAY ActionBlock
    m_OutputPageSet // OutputPageSet
}

In accordance with an embodiment of the invention, PageModel 415 may include the following data structure: The m_PageName field may include the user specified name of an HTML page. The m_URL field may include the URL of the HTML page. The m_HTML field may include the HTML page. The m_bFrameSet may indicate whether an HTML page includes frames. A frame may provide for nesting HTML pages. The m_Frame field may include the number of the frame with which the user interacts.

PageModel
{
    m_PageName // String
    m_URL // String
    m_HTML // String
    m_bFrameSet // Boolean
    m_Frame // String
}

In accordance with an embodiment of the invention, OutputPage 440 may include the following data structure: The m_title field may include strings for matching a title in an HTML page. The m_url field may include strings for matching the URL in an HTML page. The m_matchFormNum field may include an index to the form numbers in the recorded HTML page for matching forms in an HTML page. The m_matchTextString field may include strings for matching text in an HTML page. The m_matchNotTextString field may include strings for which text in an HTML page should not match. The m_PageObjects object may include a collection of PageObject. The m_RuleConstraintSet object may include information for enabling or disabling page matching rules.

OutputPage
{
    m_title // ARRAY String
    m_url // ARRAY String
    m_matchFormNum // ARRAY Integer
    m_matchTextString // ARRAY
    m_matchNotTextString // ARRAY String APP 1255
```
    m_PageObjects // PageObjects
    m_RuleConstraintSet //
}
```
In accordance with an embodiment of the invention, PageObject 460 may include the following data structure: The m_identifier field may specify a "type" of an HTML object to be matched in an HTML page received by active player 212. The "type" may include one of the following types: link "Link;" image "IMG;" or image link "IMGLink." The m_alt field may include alternate text, if any, that may appear when a cursor is positioned over a link, image, or image link. The m_dest field may include the URL destination of the link. The m_number field may include the number of the link in the HTML page. The m_src field may include the URL source of the image of the link. The m_name field may include a user specified name for the link.

```
PageObject
{
    m_identifier // Integer
    m_alt // String
    m_dest // String
    m_number // Integer
    m_src // String
    m_name // String
}
```

In accordance with an embodiment of the invention, ActionBlock 430 may store information about a recorded action in the following data structure: The m_ActionType field may include an enumerated identifier that may specify the type of the action. The valid action types may include, for example, the following: AT_UNKNOWN, the action type is unknown; AT_FORM, the action was performed on a standard HTML Form; AT_LINK, the action was performed on a standard HTML link; AT_LINKSUBMIT, the action was performed on a link such that the form data is submitted by an html link; AT_REDIRECT, the web server may cause a new page to be retrieved without any user interaction; AT_FORM_AUTO_SUBMIT, a script in a form, such as a java script may perform an automatic submit of the form (i.e. form submits itself); and AT_NAV_TO_URL, either the ActionType could not be discovered or the user requested recording of static URLs. The m_FormNum field may include a number associated with a

APP 1255 form in a recorded HTML page. The m_ElapsedTime field may include the amount of time taken to download a web page from the web server to the web browser. The m_ClickCount field may be 0 if the recorded action doesn't involve links, 1 if the recorded action is a link, or more than 1 if the user has specified alternate values for the recorded action. The m_ClickURL() field may include the destination URL of a link that a user "clicked." The m_ClickText() field may include the visible text of the link that the user "clicked." The m_ClickNum() field may include a numerical index of the link in the HTML page. The m_ClickName() field may include the user defined name for the action, such as "click." The m_FormElements field may include information for identifying elements of a form and their values.

```
ActionBlock0
{
    m_ActionType
    m_FormNum      // INTEGER
    m_ElapsedTime  // Double
    m_ClickCount   // INTEGER
    m_ClickURL()   // ARRAY String
    m_ClickText()  // ARRAY String
    m_ClickNum()   // ARRAY int
    m_ClickName()  // ARRAY String
    m_FormElements // eFormElements
}
```

The eFormElement 470 object may include information about an individual element on a FORM. In accordance with an embodiment of the invention, eFormElement 470 may include the following data structure: The m_htmlName field may include a name of a control in an HTML page. The m_uefvKey field may include a unique key that may be used to index form values. The m_userDisplayedName field may include a user defined name for the control that the user may see in place of the value specified in the m_htmlName. The m_userEnteredValueList field may include the user entered values for the field. The m_actionOrder field may include the order in which the user interacted with a particular object on a form relative to the other objects on the form.

```
eFormElement
{
```

APP 1255
```
        m_htmlName // String
        m_uefvKey // String
        m_userDisplayedName // String
        m_userEnteredValueList // String
        m_specialString // String
        m_actionOrder // Integer
}
```

In accordance with an embodiment of the invention, RuleConstraintSet 490 object may include information about page matching rules and may include the following data structure: The m_logicalNames field may include information that maps each rule to a user defined name for the rule. The m_RuleConstraints field may include a collection of RuleConstraints objects.

```
RuleConstraintSet
{
        m_logicalNames // ARRAY of String
        m_RuleConstraints //
}
```

In accordance with an embodiment of the invention, RuleConstraints 490 may include the following data structure: The m_RuleConstraint object may include a collection of RuleConstraint objects.

```
RuleConstraints
{
        m_RuleConstraint //
}
```

In accordance with an embodiment of the invention, RuleConstraint 496 may include the following data structure: The m_fieldCount field may indicate the number of entries in the m_fieldName() and the m_values() arrays. The m_fieldName field may include the names of the fields that may be used to define the rules. The m_values field may include the values for the fields corresponding to the m_fieldName field.

```
RuleConstraint
{
        m_fieldCount // Integer
        m_fieldName() // Array of String
```

APP 1255
    m_values() // Array of String
}

What is claimed is:

1. A method for monitoring a system that includes a first process running on a first computer and a second process running on a second computer, said method comprising the steps of:
monitoring communications between the first process and the second process;
detecting objects and attributes associated with the objects based on information communicated from the second process to the first process;
detecting actions performed on the objects based on information communicated from the first process to the second process;
recording the objects, the attributes, and the actions,
retrieving the objects and the attributes from the second process;
playing back the recorded actions against the retrieved objects based on the recorded attributes and the retrieved attributes to identify one or more changes in the second process.

2. The method of claim 1, further comprising the steps of:
generating additional actions based on information provided by a user; and
playing the additional actions against the retrieved objects based on the recorded attributes and the retrieved attributes to identify the one or more changes in the second process.

3. The method of claim 2, wherein the generating step and the recording step are performed on separate computers.

4. The method of claim 1, further comprising the steps of:
generating additional actions based on heuristically determined information; and
playing the additional actions against the retrieved objects based on the recorded attributes and the retrieved attributes to identify the one or more changes in the second process.

5. The method of claim 4, wherein the generating step and the recording step are performed on separate computers.

6. The method of claim 1, further comprising the steps of:
generating additional actions based on information provided by a user; and
playing the additional actions against the retrieved objects based on the recorded attributes and the retrieved attributes to identify one or more other changes in the second process.

7. The method of claim 1, further comprising the steps of:
generating additional sequences of actions based on information provided by a user; and
playing the additional sequences of actions against the retrieved objects based on the recorded attributes and the retrieved attributes to identify one or more additional changes in the second process.

8. The method of claim 1, further comprising the step of:
determining a value of at least one of the recorded attributes associated with one of the recorded objects based on a value of another recorded attribute associated with another one of the recorded objects.

9. The method of claim 1, wherein the first process includes a web browser.

10. The method of claim 1, wherein the second process includes a web server.

11. The method of claim 1, wherein the first process includes a business process.

12. The method of claim 1, wherein the second process includes a business process.

13. The method of claim 1, wherein the first process communicates with the second process using a HyperText Transfer Protocol (HTTP).

14. The method of claim 1, wherein the second process communicates with the first process using a HyperText Markup Language (HTML).

15. The method of claim 1, wherein the first process communicates with the second process using an Extensible Markup Language (XML).

16. The method of claim 1, wherein the second process communicates with the first process using an Extensible Markup Language (XML).

17. The method of claim 1, wherein the first process communicates with the second process using a Wireless Application Protocol (WAP).

18. The method of claim 1, wherein the second process communicates with the first process using a Wireless Markup Language (WML).

19. An apparatus, comprising:
a monitor that monitors communications between a first process running on a first computer and a second process running on a second computer, detects objects and attributes associated with the objects based on information communicated from the second process to the first process, and detects actions performed on the objects based on information communicated from the first process to the second process;
a recorder that records the detected objects, attributes, and actions,
a player that retrieves the objects and the associated attributes from the server and plays back the recorded actions against the retrieved objects based on the recorded attributes and the retrieved attributes to identify one or more changes in the second process.

20. The apparatus of claim 19, further comprising:
a cloner that generates additional actions based on information provided by a user such that the additional actions are played by the player against the retrieved objects based on the recorded attributes and the retrieved attributes to identify the one or more changes in the second process.

21. The apparatus of claim 19, further comprising:
a cloner that generates additional actions based on information provided by a user such that the additional actions are played by the player against the retrieved objects based on the recorded attributes and the retrieved attributes to identify one or more other changes in the second process.

22. A method for monitoring a system that includes objects and information about the objects, said method comprising the steps of:
recording one or more actions performed on one or more of the objects;
recording the objects and the information about the objects;
retrieving, from the system, the objects and the information about the objects;
performing the recorded one or more actions on the retrieved objects corresponding to the one or more objects on which the recorded one or more actions are performed, if the retrieved information about the retrieved objects corresponding to the one or more objects on which the recorded one or more actions are performed match the recorded information about the one or more objects on which the recorded one or more actions are performed; and monitoring the system based on one or more results of the step of performing the recorded one or more actions on the retrieved objects.

23. The method of claim 22, further comprising the steps of:
   determining one or more changes in the system when the retrieved information about the retrieved objects is different from the recorded information about the recorded objects; and
   monitoring the system based on the determined one or more changes.

24. The method of claim 23, wherein the step of determining one or more changes in the system comprises the step of determining the one or more changes based on one or more predetermined rules that are used to compare the retrieved information about the retrieved objects with the recorded information about the recorded objects.

25. The method of claim 24, wherein the one or more predetermined rules indicate a method for comparing the retrieved information about the retrieved objects with the recorded information about the recorded objects.

26. The method of claim 22, wherein the system includes one or more web sites.

27. The method of claim 22, wherein the step of recording the one or more actions comprises the steps of:
   monitoring communications between a first process running on a first computer and a second process running on a second computer;
   identifying the one or more actions based on the monitored communications; and
   recording the identified one or more actions.

28. The method of claim 22, wherein the step of recording the objects and the information about the objects comprises the step of recording the objects and the information about the objects based on the one or more actions performed by a user on the one or more recorded objects while the system is monitored.

29. The method of claim 22, wherein the step of recording the objects and the information about the objects comprises the steps of:
   monitoring communications between a first process running on a first computer and a second process running on a second computer;
   identifying in the monitored communications the objects and the information about the objects; and
   recording the identified objects and information about the objects.

30. The method of claim 22, wherein the step of recording the information about the objects comprises the step of recording one or more attributes of each of the objects.

31. The method of claim 22, wherein the step of recording the objects and the information about the objects further comprises the step of recording the objects and the information about the objects on a web page basis.

32. The method of claim 22, wherein the step of retrieving comprises the step of retrieving the objects and the information about the objects based on the recorded one or more actions.

33. The method of claim 22, further comprising the steps of:
   generating one or more additional actions based on the one or more objects on which the one or more actions are performed and based on the recorded information about the one or more objects on which the recorded one or more actions are performed;
   performing the generated one or more additional actions on the retrieved objects corresponding to the one or more objects on which the one or more actions are performed, if the retrieved information about the retrieved objects corresponding to the one or more objects on which the recorded one or more actions are performed match the recorded information about the one or more objects on which the recorded one or more actions are performed; and
   monitoring the system based on one or more results of the step of performing the generated one or more additional actions on the retrieved objects.

34. The method of claim 33, wherein the step of generating the one or more additional actions comprises the step of generating the one or more additional actions based on information provided by a user that defines the one or more additional actions.

35. The method of claim 33, further comprising the steps of:
   generating additional information about one or more of the recorded objects; and
   performing the generated one or more additional actions on one or more of the recorded objects.

36. The method of claim 22, further comprising the steps of:
   generating additional information about one or more of the recorded objects; and
   performing the recorded one or more actions on one or more of the recorded objects.

* * * * *